United States Patent
Babu et al.

(10) Patent No.: US 8,471,702 B2
(45) Date of Patent: Jun. 25, 2013

(54) METHOD AND SYSTEM FOR COMPRESSOR HEALTH MONITORING

(75) Inventors: Ravi Yoganatha Babu, Bangalore (IN); Vinay Bhaskar Jammu, Bangalore (IN); Achalesh Kumar Pandey, Greenville, SC (US); Sudhanshu Rai, Bangalore (IN)

(73) Assignee: General Electric Company, Niskayuna, NY (US)

( * ) Notice: Subject to any disclaimer, the term of this patent is extended or adjusted under 35 U.S.C. 154(b) by 261 days.

(21) Appl. No.: 12/976,255

(22) Filed: Dec. 22, 2010

(65) Prior Publication Data

US 2012/0161965 A1 Jun. 28, 2012

(51) Int. Cl.
*G08B 21/00* (2006.01)
*G08B 17/00* (2006.01)
*G01L 7/00* (2006.01)
*G01M 15/00* (2006.01)
*G01K 1/08* (2006.01)

(52) U.S. Cl.
USPC ........... 340/540; 340/588; 340/589; 340/611; 340/626; 340/679; 340/683; 73/714; 73/116.03; 374/142; 374/144

(58) Field of Classification Search
USPC ........................................ 340/540
See application file for complete search history.

(56) References Cited

U.S. PATENT DOCUMENTS

| | | | |
|---|---|---|---|
| 5,309,379 A * | 5/1994 | Rawlings et al. | 703/8 |
| 5,447,059 A * | 9/1995 | Miller et al. | 73/112.03 |
| 5,546,015 A | 8/1996 | Okabe | |
| 6,719,526 B2 * | 4/2004 | Sanborn et al. | 415/118 |
| 6,799,951 B2 | 10/2004 | Lifson et al. | |
| 7,765,873 B2 * | 8/2010 | Klosinski | 73/714 |
| 2005/0227078 A1 | 10/2005 | Power | |
| 2009/0240471 A1 | 9/2009 | Novis | |

FOREIGN PATENT DOCUMENTS

EP 1867850 A1 12/2007

* cited by examiner

*Primary Examiner* — Jennifer Mehmood
*Assistant Examiner* — John Mortell
(74) *Attorney, Agent, or Firm* — Richard A. DeCristofaro

(57) ABSTRACT

A method for monitoring the health of a compressor of a gas turbine is disclosed. The method includes receiving a plurality of turbine data points, wherein the plurality of turbine data points may include one or more operating parameters, at least one of a computer discharge temperature (CTD), and one or more performance parameters. The plurality of turbine data points may be categorized based on the one or more operating parameters. A statistical variability measure of at least one of the CTD and the one or more performance parameters may be computed for each of the plurality of bands. An alarm indicator may be computed based on the at least one statistical variability measure. The method may also include combining two or more of the operating parameters, the CTD and the performance parameters using sensor fusion techniques. The alarm indicator may be computed based on the combined parameters.

17 Claims, 5 Drawing Sheets

METHOD AND SYSTEM FOR COMPRESSOR HEALTH MONITORING

BACKGROUND

Embodiments presented herein relate generally to gas turbines, and particularly to online health monitoring of gas turbine compressors.

Gas turbines are widely employed in applications that require high output power while minimizing weight. Axial flow gas turbines are deployed in various applications such as auxiliary power units, industrial power plants, propulsion engines and so forth. The axial flow gas turbine typically includes a multistage compressor, a combustion chamber, and a single stage or multistage turbine.

Each stage of the multistage compressor includes a row of rotor blades followed by a row of stator blades. The working fluid flows through variable inlet guide vane (IGV) into the first stage of the compressor. The angle of the IGV controls the flow of the working fluid with the rotational speed of the rotor to improve the off-design performance of the gas turbine. In each stage, the rotor blades accelerate the working fluid. The working fluid then decelerates in the stator blade passages where the kinetic energy of the working fluid is converted into static pressure. The required overall pressure ratio is thus obtained by adding the required number of compressor stages. The process of conversion of kinetic energy to static pressure subjects the rotor blades and stator vanes to stress cycles. The stress cycles induce fatigue on the rotor and stator blades. The fatigue may lead to blade cracking, and subsequently blade liberation. Blade liberation usually leads to total failure of compressor.

Some known methods to detect compressor blade damage rely on periodic inspections of the compressor blades. Observations from the periodic inspections may then be used to run complex simulations to predict failure of the compressor blades. However, such methods may typically require the gas turbine to be shut down for inspection. Further, accurate simulations may require high computational capability and may not account for changes in operating conditions. Some other known methods rely on vibration measurements to detect anomalous vibrations. However, methods based on vibration measurements suffer from high rate of false alarms.

Therefore, there is a need for a system that provides accurate online detection of incipient failure of the compressor blades.

BRIEF DESCRIPTION OF EMBODIMENTS

A method for compressor health monitoring is disclosed. The method includes receiving a plurality of turbine data points, wherein each of the turbine data points includes one or more operating parameters, and at least one of a compressor discharge temperature (CTD) and one or more performance parameters. The method further includes categorizing the turbine data points into a plurality of bands based on the one or more operating parameters, computing at least one statistical variability measure of at least one of the CTD and the one or more performance parameters, for each of the plurality of bands and generating an alarm indicator based on the at least one statistical variability measure.

The method may also include a step of combining the CTD and the one or more performance parameters and generating the alarm indicator based on the combined parameters. In an embodiment one or more vibration parameters, the CTD and the one or more performance parameters may be combined to obtain the combined parameter. The alarm indicator may be generated based on the combined parameter.

DETAILED DESCRIPTION OF EMBODIMENTS

Figure 1:
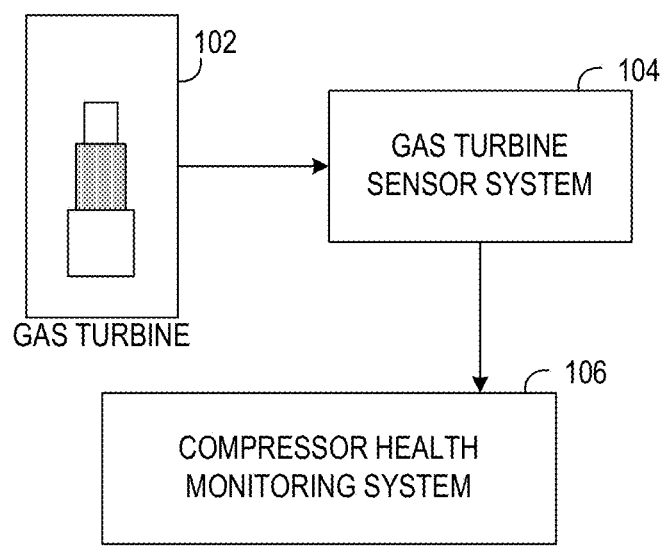
FIG. 1 is a block diagram of an environment in which embodiments of a compressor health monitoring system may operate.

Embodiments presented herein disclose a method and a system for monitoring health of a compressor of a gas turbine. FIG. 1 is a block diagram of an environment in which embodiments of a compressor health monitoring system may operate. The environment includes a gas turbine 102, a gas turbine sensor system 104 and a compressor health monitoring system 106.

The gas turbine 102 typically includes a compressor section, a combustion chamber, one or more inlet bleed valves and a rotor. The gas turbine 102 breathes in ambient air through a compressor inlet. The compressor section may include a multi-stage compressor. Each stage of the multi-stage compressor includes a row of rotor blades followed by a row of stator blades. The working fluid flows through variable inlet guide vane (IGV) into the first stage of the compressor. The angle of the IGV controls the flow of the working fluid with the rotational speed of the rotor to improve the off-design performance of the gas turbine. In each stage, the rotor blades accelerate the working fluid. The working fluid then decelerates in the stator blade passages where the kinetic energy of the working fluid is converted into static pressure. The required overall pressure ratio is thus obtained by adding the required number of compressor stages. The pressurized air is then transferred to the combustion chamber. In the combustion chamber, the compressed air is mixed with a suitable fuel, and ignited. The combustion of the fuel results in a high pressure exhaust, which drives a turbine rotor. The turbine rotor may drive a mechanical load coupled to it. Alternatively, the high pressure exhaust gas may be expelled to generate thrust. The bleed valves, when activated siphon off a portion of compressor discharge air directly into the gas turbine exhaust. The bleed valves are activated only during acceleration of the gas turbine 102, such as during start-up, and during deceleration of the gas turbine 102, such as during shut-down. The bleed valves protect the compressor from stall or surge conditions. The bleed valves may be activated pneumatically, or electro-mechanically.

The gas turbine sensor system 104 may include sensors for monitoring various operating parameters of the gas turbine 102. The gas turbine sensor system may have sensors for monitoring operating parameters such as, but not limited to, a turbine load, a compressor inlet temperature, an inlet bleed heat state, a compressor pressure ratio (CPR), and the like. The compressor inlet temperature may be sensed at one or more peripheral locations at the compressor inlet. The gas turbine sensor system 104 may further include sensors for monitoring performance parameters of the gas turbine 102 such as, but not limited to, a turbine efficiency, a turbine inlet flow, a turbine power, an exhaust temperature and the like. The gas turbine sensor system 104 may further include sensors for monitoring a compressor discharge temperature (CTD). The CTD may be monitored at one or more peripheral locations at an outlet of the compressor. The gas turbine sensor system 104 may also include sensors for measuring one or more vibration parameters associated with the operation of the gas turbine. The vibration parameters may include the amplitude of vibration, frequency of vibration. The vibration parameters may be monitored at various locations on the compressor.

The gas turbine sensor system 104 transfers the monitored parameters to the compressor health monitoring system 106 for detecting the health state of the compressor stages.

Figure 2:
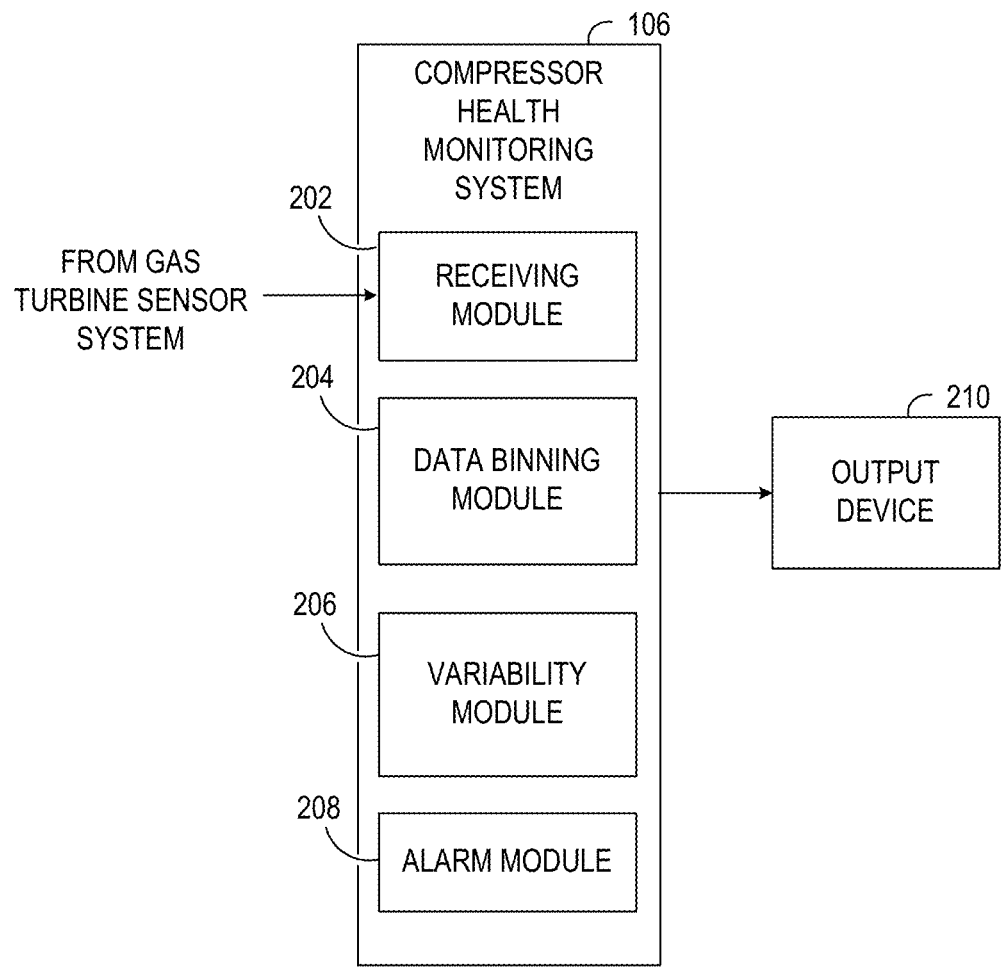
FIG. 2 is a block diagram of a compressor health monitoring system, in accordance with one embodiment.

FIG. 2 is a block diagram of the compressor health monitoring system 106, in accordance with one embodiment. The compressor monitoring system 106 may receive a plurality of turbine data points. The turbine data points may include one or more operating parameters of the turbine, one or more CTDs measured at various peripheral locations at the outlet of the compressor, one or more performance parameters and the like.

The compressor health monitoring system 106 may include a receiving module 202 for receiving the plurality of turbine data points from the gas turbine sensor system 104. The gas turbine may dispatch the plurality of turbine data points in a wired or wireless manner.

The compressor health monitoring system 106 may further include a data binning module 204. The data binning module 204 categorizes the plurality of turbine data points into a plurality of bands based on the operating parameters. The plurality of the turbine data points may be obtained over a period of time. During this period of time, the operating conditions of the turbine may have changed. Therefore it may be useful to categorize the plurality of turbine data points obtained into the plurality of bands, wherein each of the plurality of bands may correspond to a particular operating condition. Thus, the variation of CTD and performance parameters within a band is independent of the operating condition of the gas turbine 102.

For example, the plurality of turbine data points may be categorized into two bands based on the bleed heat state of the gas turbine 102. The first band may include those turbine data points which are obtained when the bleed heat was turned off and the second band may include those turbine data points which are obtained when the bleed heat was turned on. The above two bands may be further divided into two bands based on a difference of the compressor inlet temperature (CTIF) difference, measured at two or more peripheral locations at the compressor inlet. For example, the turbine data points which are obtained when the CTIF difference may be higher than a threshold may be categorized into one band and the turbine data points which are obtained when the CTIF difference is lower than a threshold may be categorized into another band. A similar categorization may be done based on the compressor pressure ratio (CPR).

The binning module 204 may categorize the turbine data points into bands based on a combination of operating parameters. For example, a band may consist of only those turbine data point that were obtained when the bleed heat is turned on, the CTIF difference is higher than a CTIF threshold and the CPR is higher than a CPR threshold. the threshold for CPR may be 13. Such a classification of the turbine data points into bands is for the purpose of illustration and the turbine data points may be categorized based on other operating parameters or other combination of operating parameters also. Further, the thresholds for the operating parameters may also be dynamically decided.

The compressor health monitoring system 106 may further consist of a variability module 206. The variability module 206 computes a statistical variability measure of at least one of the CTD and the one or more performance parameters, for each of the plurality of bands.

The variability module 206 may include a baseline variability module. The baseline variability module may compute a baseline variability measure of the CTD and the one or more performance parameters. The baseline variability measure may be computed for each of the plurality of bands over a first time window. In various embodiments, the first time window may be in the range of 3-12 hours, for instance 6 hours.

The baseline variability measure may include a mean of the difference of CTD obtained at various peripheral locations at the compressor outlet. The baseline statistical variability measure may include a mean of the one or more performance parameters. Alternatively, the baseline statistical variability measure may include a median or a standard deviation of the CTD difference. The baseline variability measure may further include median or standard deviation of performance parameters obtained over the first time window.

The variability module 206 may further include a current variability module for computing a current variability measure of CTD difference and the one or more performance parameters. The current variability measure may be computed for all the plurality of bands into which the turbine data points may be categorized. Further, the current statistical variability measure may be obtained for turbine data points obtained within a second time window. The second time window may be shorter than the first time window. In an embodiment, the second time window may be of 15 minutes or 30 minutes duration.

The current variability measure may be mean of the CTD difference of turbine data points obtained over the second time window. The current variability measure may further include a mean of the one or more performance parameters. In an embodiment, the current variability measure may be the median or the standard deviation of the CTD difference and one or more performance parameters of the turbine data points obtained over the second time window.

The baseline variability measure and the current variability measure may be utilized to obtain an alarm indicator. An alarm module 208 may generate the alarm indicator. The alarm indicator may be the difference between the baseline variability measure and the current variability measure. For example, the alarm indicator may be obtained by computing the difference between the mean CTD difference obtained over the first time window and the mean CTD difference obtained over the second time window. Similarly, the alarm indicator may be obtained by computing the difference of the mean of the performance parameters obtained over the first time window and the mean of the performance parameters obtained over the second time window. In one embodiment, the alarm indicator may be obtained by computing the difference of the median or the standard deviation of the CTD difference obtained over the first time window and the second time window. In another embodiment, the alarm indicator may further be obtained by computing the difference of the median or the standard deviation of the performance parameters obtained over the first time window and the second time window respectively.

The alarm module 208 may compare the alarm indicator with a threshold, if the alarm indicator exceeds a threshold value for a time period longer than a specified time period then an alarm may be raised. In an embodiment, the alarm is raised if the alarm indicator exceeds the threshold value for more than 15 minutes. In various embodiments, the alarm may be raised if the alarm indicator exceeds the threshold for a time period ranging form 10-60 minutes.

The compressor health monitoring system 106 may further include an ISO normalization module for normalizing the operating parameters, the CTD and the performance parameters to ISO standard parameters. Converting the parameters to ISO standard parameters ensures applicability of the compressor health monitoring system 106 to any gas turbine unit, operating in any environment. The units and properties of the operating parameters, the CTD and the performance parameters may depend on the measuring device. For example, CTD may be measured both in Fahrenheit and Centigrade. The normalized CTD and the normalized performance parameters may be used for obtaining the baseline statistical variability measure and the current baseline statistical variability measure and for subsequently obtaining the alarm indicator. The normalization of parameters may render the system applicable irrespective of the units in which the parameters are measured.

The compressor health monitoring system 106 may further include a sensor fusion module for combining the CTD and the one or more performance parameters. Known in the art fusion algorithms such as kalman filter algorithm, Bayesian networks algorithm, Dempster-Shafer algorithm may be applied for fusing the operation parameters, the CTD and the performance parameters. The fusion of parameters may generate a fused parameter consisting of properties of each of operating parameters, the CTD and the performance parameters. In one embodiment, the fused parameter may be obtained for both the first time window and the second time window. Further, the baseline variability measure and the current variability measure may be computed based on the fused parameter. Also, the alarm indicator may be obtained based on the difference of the baseline statistical variability measure and the current statistical variability measure corresponding to the fused parameter.

Figure 3:
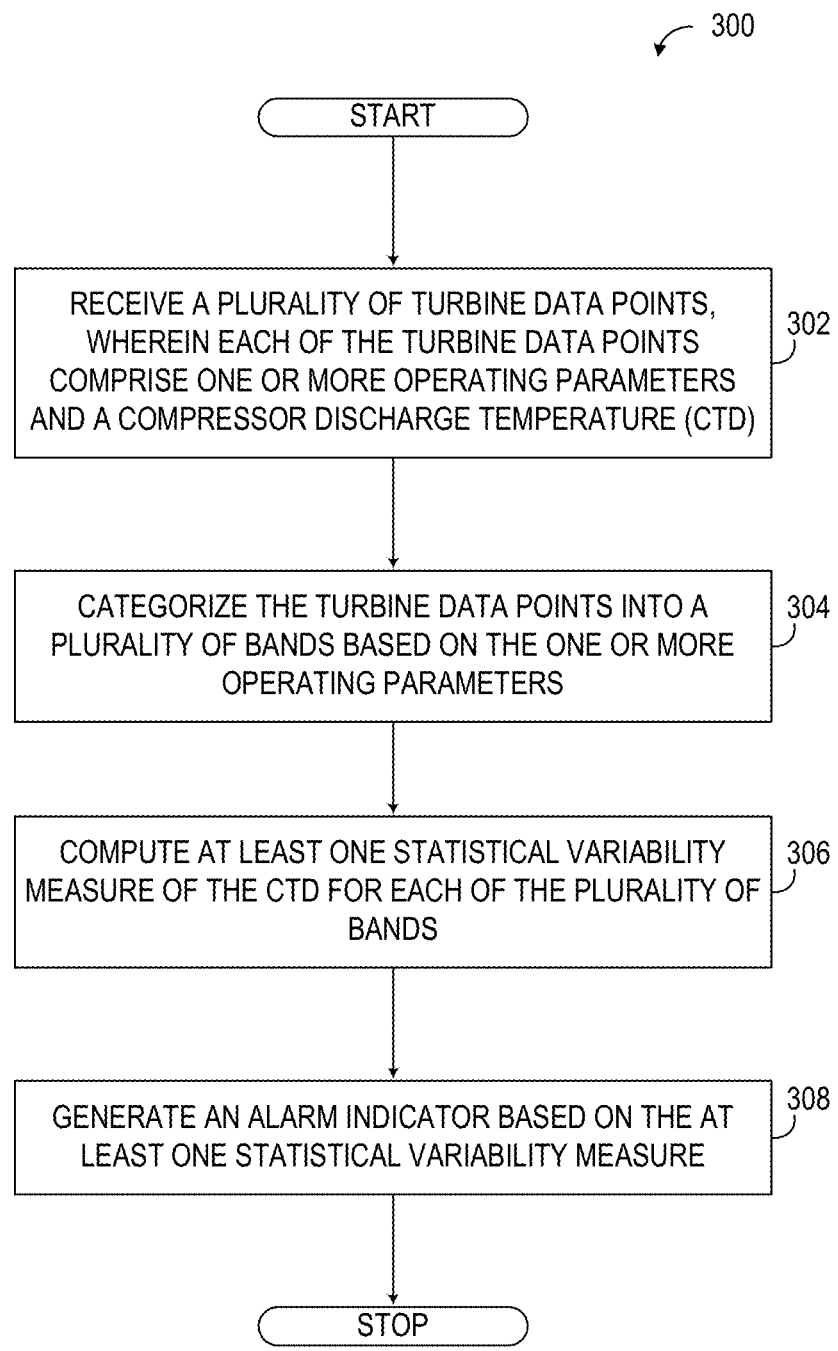
FIG. 3 is a flowchart illustrating an exemplary process of compressor prognostics based on compressor discharge temperature, in accordance with one embodiment.

FIG. 3 is a flowchart illustrating a process 300 of compressor prognostics based on CTD in accordance with one embodiment. In step 302 the plurality of turbine data points may be obtained. As mentioned in connection with FIG. 2 the plurality of turbine data points may include one or more operating parameters wherein the operating parameters may include the turbine load, the compressor inlet temperature, the inlet bleed state and the CPR. The plurality of turbine data points may also include the CTD measured at one or more peripheral locations at the compressor outlet. The plurality of turbine data points may further include one or more performance parameters wherein the performance parameters may include the turbine efficiency, the turbine inlet flow, the turbine power, and the exhaust temperature.

In step 304 of the process 300 the turbine data points are categorized into a plurality of bands based on the one or more operating parameters. For example, the plurality of turbine data points may be categorized into two bands based on the bleed heat state of the gas turbine 102. The first band may include those turbine data points which are obtained when the bleed heat was turned off and the second band may include those turbine data points which are obtained when the bleed heat was turned on. The above two bands may be further divided into two bands based on the CTIF difference measured at two peripheral locations at the compressor inlet. For example, the turbine data points which are obtained when the CTIF difference may be higher than a threshold may be categorized into a band and the turbine data points which are obtained when the CTIF difference is lower than a threshold may be categorized into a different band. A similar categorization may be done based on the compressor pressure ratio (CPR).

It may be appreciated by those skilled in the art that the categorization of turbine data points into bands may be based simultaneously on more than one operating parameters. For example, a band may consist of only those turbine data point that were obtained when the bleed heat was turned on, the CTIF difference was higher than a threshold and the CPR may be higher than another threshold. In an embodiment the threshold for CPR may be 13. It may be appreciated by those skilled in the art that the above mentioned classification of bands is for the purpose of illustration and the turbine data points may be categorized based on other operating parameters or other combination of operating parameters. It may also be appreciated that the thresholds for each operating parameter may also be dynamically decided.

In step 306 of process 300, a statistical variability measure for the CTD difference may be computed. The statistical variability measure may be computed for each of the plurality of bands into which the turbine data points are categorized. In step 306 both the baseline variability measure and the current variability measure for the CTD difference may be computed. As illustrated in connection with FIG. 2 the baseline variability measure may be mean, median or standard deviation of the CTD differences obtained over the first window period. Similarly the current variability measure may be mean, median or standard deviation of the CTD differences obtained over the second time window.

In step 308 an alarm indicator is generated based on the baseline statistical variability measure and the current statistical variability measure. In an embodiment, the alarm indicator may be the difference of the baseline variability measure and the current variability measure. If the alarm indicator is higher than a threshold for a time period longer than a specified time period then an alarm may be raised. In an embodiment, the alarm is raised if the alarm indicator exceeds the threshold value for more than 15 minutes. In various embodiments, the alarm may be raised if the alarm indicator exceeds the threshold for a time period ranging form 10-60 minutes.

The process 300 evaluates the alarm indicator based on the CTD difference measurements over the first time window and the second time window. It may be appreciated by those skilled in the art that the alarm indicator may also be obtained based on the performance parameters of the gas turbine 102. The process of compressor prognostics based on the performance parameters of the gas turbine 102 is illustrated in connection with FIG. 4.

Figure 4:
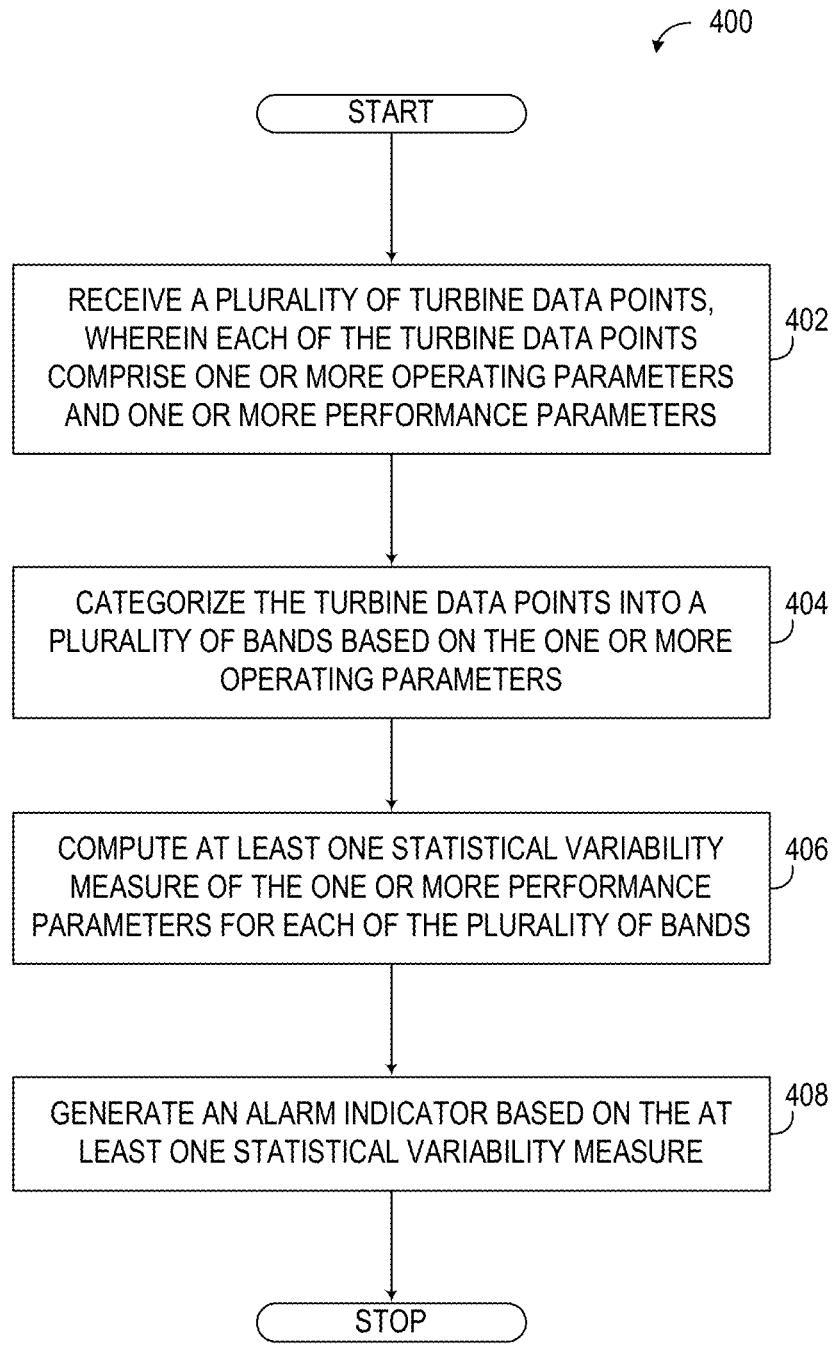
FIG. 4 is a flowchart illustrating an exemplary process of compressor prognostics based on gas turbine performance parameters, in accordance with one embodiment.

FIG. 4 is a flowchart illustrating a process 400 of compressor prognostics based on the performance parameters of the gas turbine 102. In step 402 the plurality of turbine data points may be obtained. Obtaining of the plurality of turbine data points may be done as described in connection with step 302 of the process 300.

In step 404 of the process 400 the turbine data points are categorized into a plurality of bands based on the one or more operating parameters. The organization of the plurality of turbine data points into the plurality of bands may be done as described in connection with step 304 of the process 300.

In step 406 of process 400, a statistical variability measure for the one or more performance parameters of the gas turbine 102 may be computed. The statistical variability measure may be computed for each of the plurality of bands into which the turbine data points are categorized. In step 406 both the baseline variability measure and the statistical variability measure for the one or more performance parameters may be computed. As illustrated in connection with FIG. 2 the baseline statistical variability measure may be mean, median or standard deviation of the one or more performance parameters obtained over the first window period. Similarly the current statistical variability measure may be mean, median or standard deviation of the one or more performance parameters obtained over the second time window.

In step 408 an alarm indicator may be computed based on the baseline statistical variability measure and the current statistical variability measure. The computation of the alarm indicator may be carried out as described in connection with step 308 of process 300.

The processes 300 and 400 may further normalize the operating parameters, the CTD and the performance parameters, to ISO standard parameters. In an embodiment, both the baseline variability measure and the current variability measure may be computed based on the normalized parameters. Further, the alarm indicator may also be computed based on the normalized parameters. The alarm may be raised based on the alarm indicator thus obtained.

Figure 5:
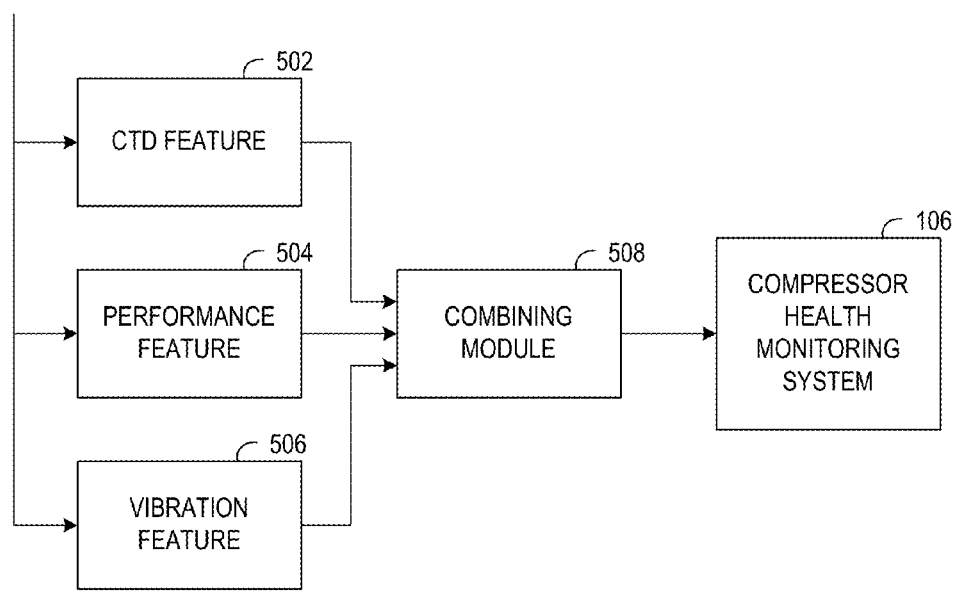
FIG. 5 is a flowchart illustrating an exemplary process of compressor prognostics using a fusion methodology, in accordance with one embodiment.

FIG. 5 is a flow chart illustrating a process 500 of compressor diagnostics using a fusion methodology, in accordance with one embodiment. The process obtains the operating parameters, the CTD and the performance parameters form the gas turbine sensor system 104. The process may further obtain vibration parameters of the gas turbine 102. The vibration parameters may include amplitude of vibration, a frequency of vibration and the like.

The CTD feature 502, the performance feature 504 and the vibration feature 506 may obtain the CTD, the one or more performance parameters, and the vibration parameters for the gas turbine sensor system respectively. The CTD, the performance parameters, the vibration parameters are then conveyed to the combining module 508. The combining module 508 may fused at least two of the CTD, performance parameters and the vibration parameters to obtain fusion parameters. The combining module 508 may use a variety of fusion algorithms such as Kalman filter algorithm, Bayesian networks algorithms, Dempster-Shafer algorithms and the like. In an embodiment, the CTD and the operational parameters are fused to obtain the fusion parameter. In an alternate embodiment, the CTD, operating parameter, performance parameters may be fused to obtain the fusion parameter.

The fused parameters may be conveyed to the compressor health monitoring module 106. The compressor health monitoring module may compute the alarm indicator based on the fused parameters. The fused parameter obtained over the first time window and the second time window for computing the baseline variability measure and the current variability measure. The alarm indicator may be computed based on the baseline variability measure and the current variability measure.

Embodiments presented herein further include a computer program product for executing the steps described in FIG. 3, FIG. 4 and FIG. 5. The computer program product comprises coded instructions stored in a non-transitory computer readable medium. The computer readable medium may be any one of a Random Access Memory (RAM), Read Only Memory (ROM), Programmable Read Only Memory (PROM), Erasable Programmable Read Only Memory (EPROM) and the like. The coded instructions may be executed by one or more processors. The coded instructions of the computer program product may include instructions for receiving the plurality of turbine data points, categorizing the turbine data points into a plurality of bands based on the one or more operating parameters, computing the baseline variability measure and the current variability measure of the CTD and the performance parameters of the gas turbine 102. The computer program product may also include instructions for computing the alarm indicator based on the baseline variability measure and the current variability measure. The computer program product may have instructions for normalizing the one or more operating parameters, the CTD, the one or more performance parameters to ISO standard ratings.

The computer program product may further include instructions for receiving one or more vibration parameters of the turbine 102. The computer program product may further include instructions for combining the CTD and one or more performance parameters using one or more sensor fusion techniques. In an embodiment, the computer program product may include instructions for combining the one or more vibration parameter, the CTD, and the one or more performance parameters using one or more fusion techniques. The sensor fusion techniques may include one or more of Kalman filter algorithm, Bayesian networks algorithms, Dempster-Shafer algorithms and the like.

The embodiments described herein are solely for the purpose of illustration. Persons skilled in the art will recognize from this description that the teachings presented herein are not limited to the embodiments described, but may be practiced with modifications and alterations limited only by the spirit and scope of the appended claims.

The invention claimed is:

1. A method for compressor health monitoring comprising:
receiving a plurality of turbine data points, wherein each of the turbine data points comprise one or more operating parameters and at least one of a compressor discharge temperature (CTD), and one or more performance parameters;
categorizing the turbine data points into a plurality of bands based on the one or more operating parameters;
computing a baseline variability measure of at least one of the CTD and the one or more performance parameters, for each of the plurality of bands over a first time window;
computing a current variability measure of at least one of the CTD and the one or more performance parameters, for each of the plurality of bands over a second time window, wherein the second time window is shorter than the first time window;
comparing the baseline variability measure and the current variability measure; and
generating an alarm indicator if the current variability measure deviates from the baseline variability measure by a predefined difference.

2. The method of claim 1, wherein the one or more operating parameters comprise a turbine load, a compressor inlet temperature, an inlet bleed heat state, and a compressor pressure ratio (CPR).

3. The method of claim 1, wherein the one or more performance parameters comprise a turbine efficiency, a turbine inlet flow, a turbine power, and an exhaust temperature.

4. The method of claim 1 further comprising normalizing the one or more operating parameters, the CTD, and the one or more performance parameters to ISO standard ratings.

5. The method of claim 1 further comprising:
combining the CTD and the one or more performance parameters using one or more sensor fusion techniques; and
generating the alarm indicator based on the combined parameters.

6. The method of claim 5 further comprising:
receiving one or more vibration parameters associated with each of the plurality of turbine data points;
combining the one or more vibration parameters, the CTD, and the one or more performance parameters using one or more sensor fusion techniques.

7. A system for compressor health monitoring comprising:
a receiving module for receiving a plurality of turbine data points, wherein each of the turbine data points comprise one or more operating parameters and at least one of a compressor discharge temperature (CTD), and one or more performance parameters;
a data binning module for categorizing the turbine data points into a plurality of bands based on the one or more operating parameters;
a baseline variability module for computing a baseline variability measure of at least one of the CTD and the one or more performance parameters, for each of the plurality of bands over a first time window;
a current variability module for computing a current variability measure of at least one of the CTD and the one or more performance parameters, for each of the plurality of bands over a second time window, wherein the second time window is shorter than the first time window; and
an alarm module for generating an alarm indicator if the current variability measure deviates from the baseline variability measure by a predefined difference.

8. The system of claim 7, wherein the one or more operating parameters comprise a turbine load, a compressor inlet temperature, an inlet bleed heat state, and a compressor pressure ratio (CPR).

9. The system of claim 7, wherein the one or more performance parameters comprise a turbine efficiency, a turbine inlet flow, a turbine power, and an exhaust temperature.

10. The system of claim 7 further comprising an ISO normalizing module for normalizing the one or more operating parameters, the CTD, and the one or more performance parameters to ISO standard ratings.

11. The system of claim 7 further comprising a sensor fusion module for combining the CTD and the one or more performance parameters using one or more sensor fusion techniques.

12. A computer program product comprising a non-transitory computer readable medium encoded with computer-executable instructions for monitoring health of a compressor, wherein the computer-executable instructions, when executed, cause one or more processors to:
receive a plurality of turbine data points, wherein each of the turbine data points comprise one or more operating parameters and at least one of a compressor discharge temperature (CTD), and one or more performance parameters;
categorize the turbine data points into a plurality of bands based on the one or more operating parameters;
compute a baseline variability measure of at least one of the CTD and the one or more performance parameters, for each of the plurality of bands over a first time window;
compute a current variability measure of at least one of the CTD and the one or more performance parameters, for each of the plurality of bands over a second time window, wherein the second time window is shorter than the first time window;
compare the baseline variability measure and the current variability measure; and
generate an alarm indicator if the current variability measure deviates from the baseline variability measure by a predefined difference.

13. The computer program product of claim 12, wherein the one or more operating parameters comprise a turbine load, a compressor inlet temperature, an inlet bleed heat state, and a compressor pressure ratio (CPR).

14. The computer program product of claim 12, wherein the one or more performance parameters comprise a turbine efficiency, a turbine inlet flow, a turbine power, and an exhaust temperature.

15. The computer program product of claim 12, further comprising computer executable instructions to cause the one or more processors to normalize the one or more operating parameters, the CTD, and the one or more performance parameters to ISO standard ratings.

16. The computer program product of claim 12, further comprising computer executable instructions to cause the one or more processors to:
combine the CTD and the one or more performance parameters using one or more sensor fusion techniques; and
generate the alarm indicator based on the combined parameters.

17. The computer program product of claim 12, further comprising computer executable instructions to cause the one or more processors to:
receive one or more vibration parameters associated with each of the plurality of turbine data points; and
combine the one or more vibration parameters, the CTD and the one or more performance parameters using one or more sensor fusion techniques.

* * * * *